United States Patent [19]

Hakola

[11] Patent Number: 4,623,458

[45] Date of Patent: * Nov. 18, 1986

[54] QUICK RELEASE EXPENDABLE APEX APPARATUS WITH BONDED LINER

[76] Inventor: Gordon R. Hakola, 7551 N. Palm Cir., Tucson, Ariz. 85704

[*] Notice: The portion of the term of this patent subsequent to Sep. 17, 2002 has been disclaimed.

[21] Appl. No.: 721,076

[22] Filed: Apr. 8, 1985

Related U.S. Application Data

[63] Continuation-in-part of Ser. No. 515,282, Jul. 19, 1983, Pat. No. 4,541,934.

[51] Int. Cl.⁴ .............................................. B01D 45/12
[52] U.S. Cl. ................................. 210/238; 210/512.1; 209/139 A; 209/144; 209/211
[58] Field of Search ............... 210/787, 788, 789, 232, 210/237, 238, 304, 512.1, 512.2, 512.3; 209/139 R, 139 A, 144, 199, 211; 55/435, 459 R; 406/173; 162/272

[56] References Cited

U.S. PATENT DOCUMENTS

| | | | |
|---|---|---|---|
| 3,370,408 | 2/1968 | Lehrer et al. | 210/512.1 |
| 3,724,674 | 4/1973 | Loison | 210/512.1 |
| 3,902,601 | 9/1975 | Townley | 209/144 |
| 3,947,364 | 3/1976 | Laval, Jr. | 210/788 |
| 4,163,726 | 8/1979 | Wilson et al. | 210/512.1 |
| 4,308,134 | 12/1981 | Lilleker et al. | 210/512.1 |
| 4,400,267 | 8/1983 | Brose | 209/211 |
| 4,541,934 | 9/1985 | Hakola | 210/512.1 |

Primary Examiner—Peter Hruskoci
Assistant Examiner—Wanda L. Millard
Attorney, Agent, or Firm—Cahill, Sutton & Thomas

[57] ABSTRACT

A quick release apex apparatus for a cyclone includes a semirigid cast urethane, neoprene/fiberglass, or plastic housing having a liner chemically bonded to the interior of the semirigid housing. The semirigid housing includes an integral splash skirt and an upper annular flange for clamping the apex to the bottom flange of a cone of the cyclone. A quick release split ring clamp has a first section bolted to the flange of the cone and a second section pivotally connected to the first section. A single worker can change a worn apex of large cyclone by using one hand to hold the apex in its proper position and the other hand to release the second section of the quick release clamp and swing it away from the apex flange. The worker then removes the worn apex, sets it aside, lifts a replacement unit into alignment with the cone, swings the second section of the quick release clamp closed and locks it. A weep hole extending through the wall of the semi-rigid housing allows a small amount of leakage when the liner is worn through.

10 Claims, 24 Drawing Figures

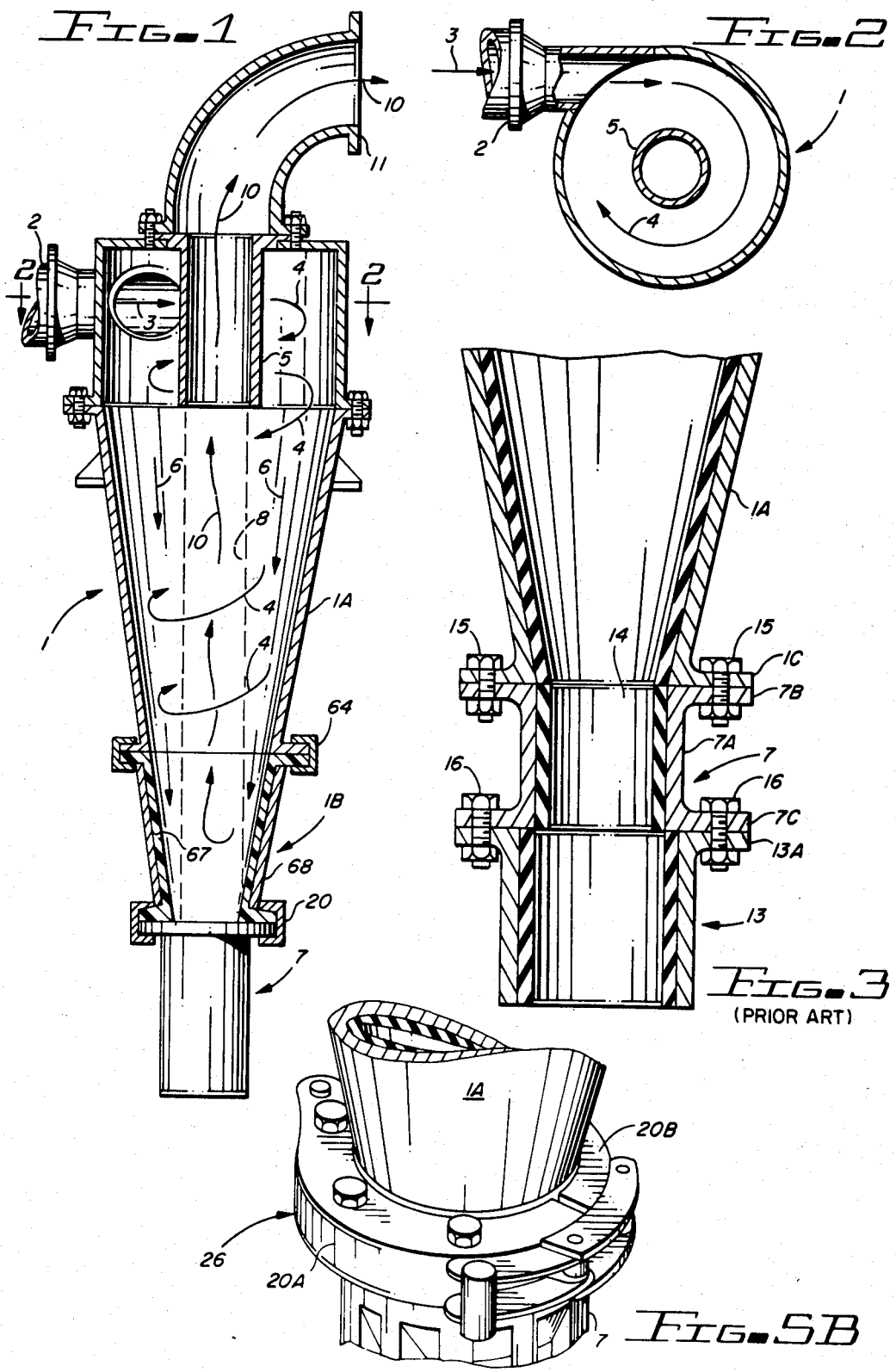

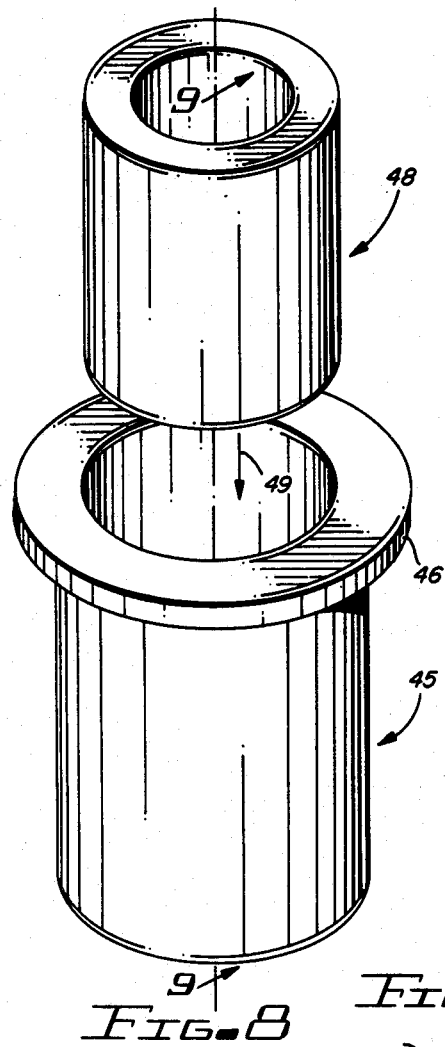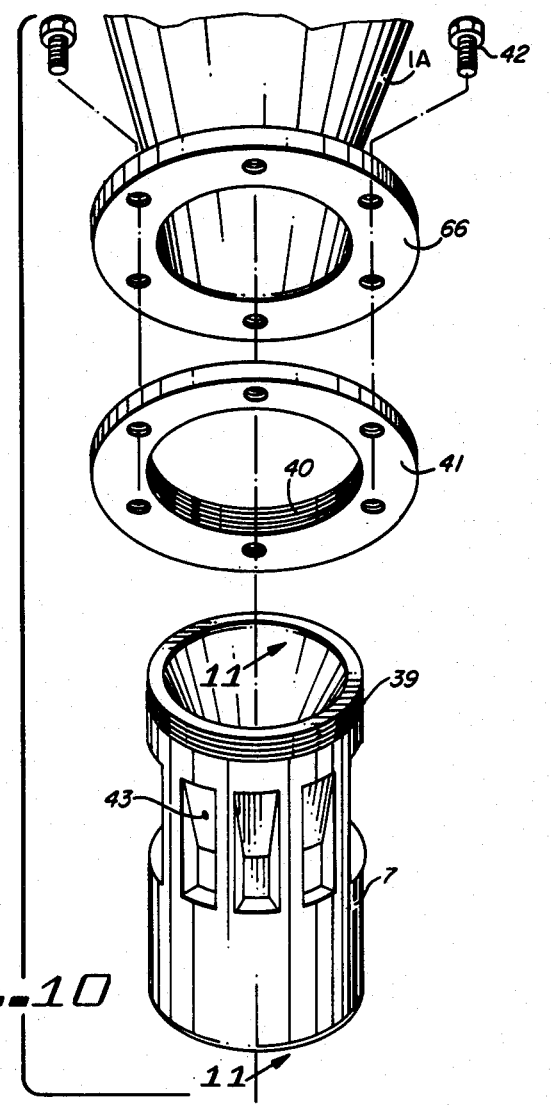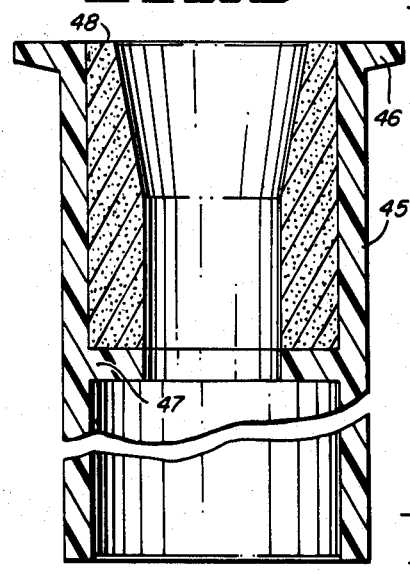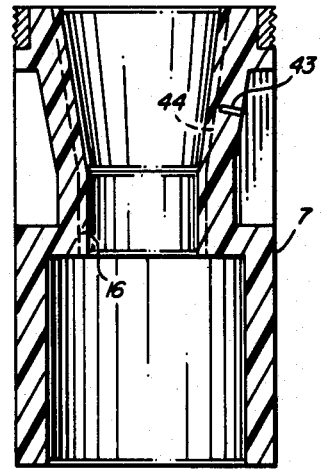

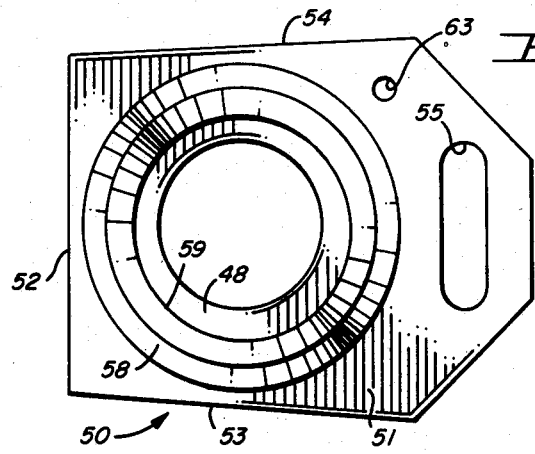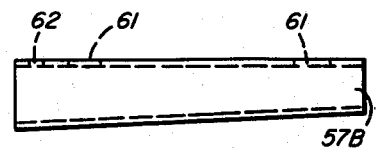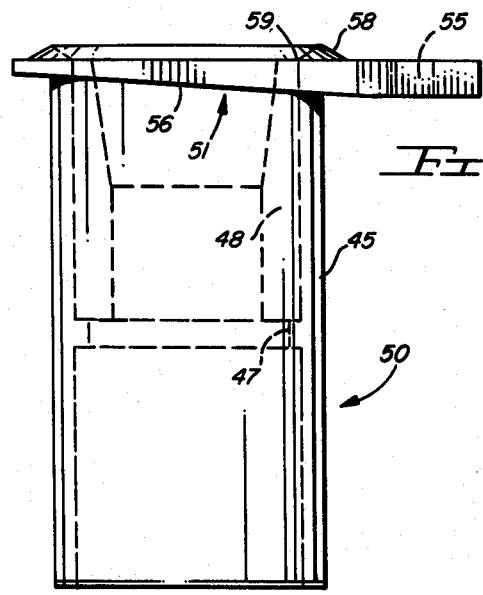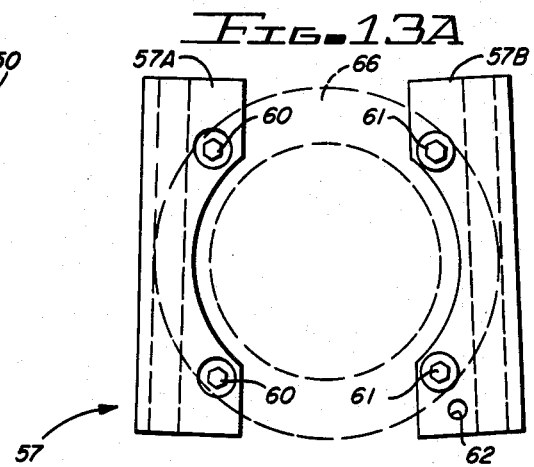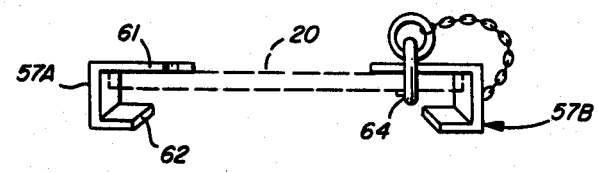

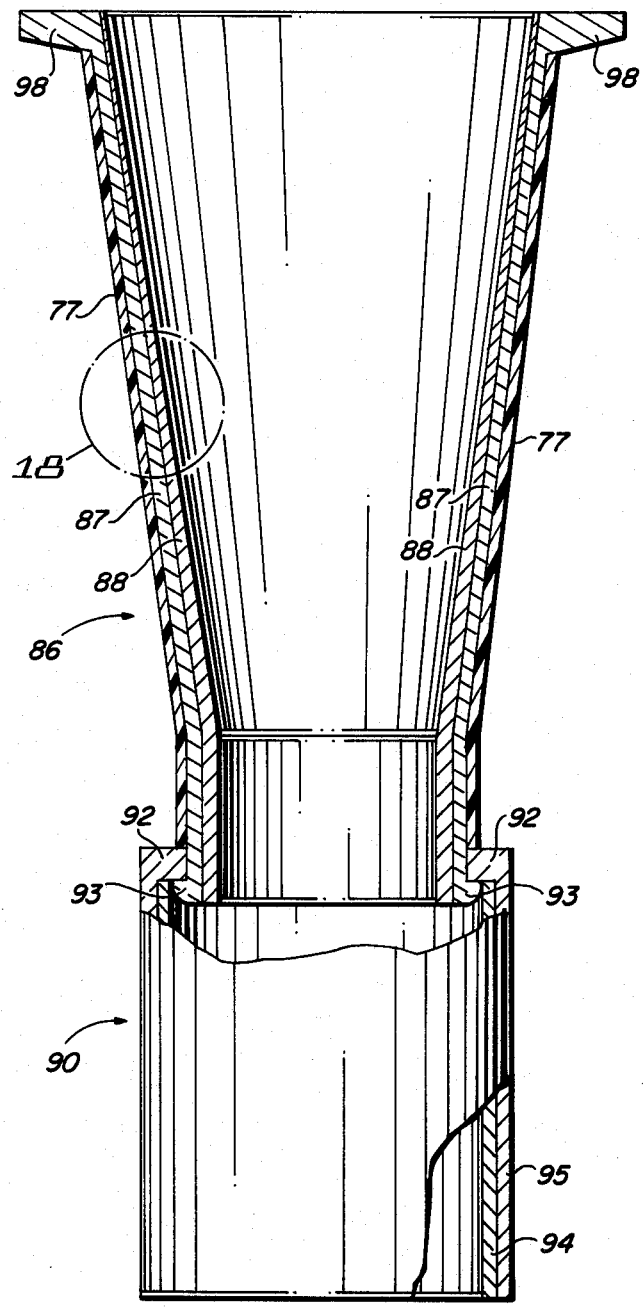
FIG_17
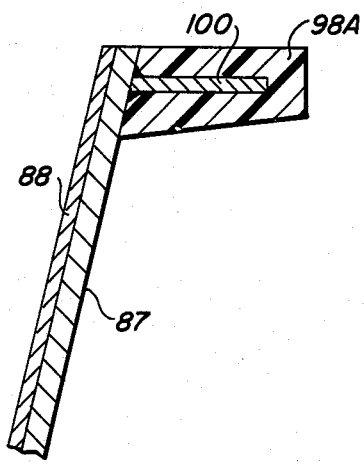
FIG_17A
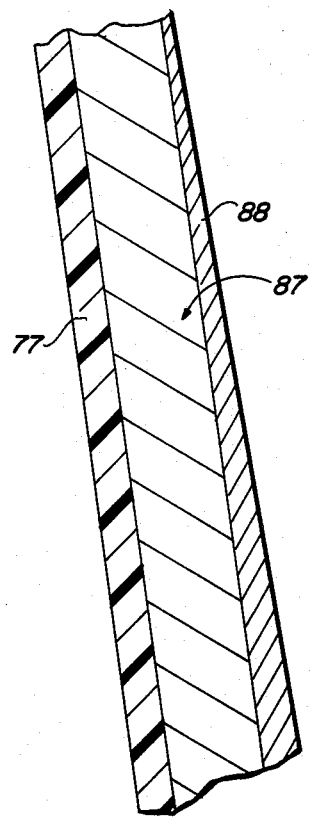
FIG_18

QUICK RELEASE EXPENDABLE APEX APPARATUS WITH BONDED LINER

RELATED APPLICATIONS

This application is a continuation-in-part of my copendingh application "QUICK RELEASE CYCLONE APEX APPARATUS", Ser. No. 515,282, filed July 19, 1983, now U.S. Pat. No. 4,541,934.

BACKGROUND OF THE INVENTION

The invention relates to cyclones and, more particularly, to throw-away apexes and quick release means for exchanging worn apexes for new ones, and especially apexes with semi-rigid housings and having liners chemically bonded therein.

Cyclones and hydrocyclones are devices which are used in various industries to separate different size particles that are fed as a mixture into a cyclone inlet. In ore processing industries, cyclones are in circuit with grinding mills and are usually assembled in a circular "cluster" over a circular "tub" into which the coarser particles passing through the cyclone are discharged and fed back into the grinding mill. The outlet or overflow of the cyclone is where the fine particles that are internally separated pass out of the cyclone. As those skilled in the art know, cyclones include as their primary components an inlet chamber, an internal vortex finder and outlet, a cone section which tapers down from a large diameter to a small diameter, and an apex through which coarse particles and liquid carrying them are discharged. As the coarse particles rotate and fall toward the apex, the density of particles in the liquid thereof increases and abrasion of the apex caused thereby increases. Since the primary function of the apex orifice of a cyclone is to discharge the coarse material at the highest possible density, and since the amount of water leaving the cyclone with the coarse material is critical, the proper apex diameter for a particular cyclone and set of operating conditions also is critical. If the apex orifice is too small, the cyclone will plug, and the entire cyclone feed, including the coarse particles, will pass out of the cyclone overflow outlet. On the other hand, if the apex orifice is too large, excessive amounts of water pass out of the lower end or underflow of the cyclone. Such excessive amounts of water passing through the cyclone underflow outlet pull excessive amounts of the fine particles that should otherwise "separate" into the vortex section and be discharged as overflow. The fine particles then unnecessarily pass back through the grinding mill, resulting in an inefficient milling operation. Other factors than apex diameter also strongly effect the performance of the cyclone, including the inlet feed density, the solids and the specific gravities of the solid material and the liquid material being fed to the inlet, the viscosity of the slurry material, and the pressure drop across the cyclone. Nevertheless, a hiqh maintenance item of any cyclone is usually the apex. Typically, prior art cyclone apexes include a loose cylindrical body section with a liner which can be composed of ceramic, neoprene, urethane, or rubber, depending upon the abrasion and corrosion resistant properties needed for the material passing through the apex. In most instances, the lower cone section, apexes, and anti-splash skirt extensions are all assemblies with "bolt on" flange connections. Due to the high liquid environment (usually water), rusting of the bolts interconnecting the flanges of the different removable sections typically occurs. Often, removal of an apex is a two man operation, one worker using wrenches to remove the bolts, the other worker holding the apex and/or skirt in place. If excessive rusting has occured, it may be necessary to call a welder, who cuts or "burns" the bolts off. For a large state-of-the-art cyclone which may have a diameter as large as two feet or more, the services of two workers may be required for approximately fifteen minutes to over an hour to change one worn out apex. Typically, the apex of a cyclone may be changed every two or three months or more, depending on the operation and ore characteristics. Occasionally, steel grinding balls and oversize ore are circulated through pumps and into the cyclones, usually as a result of damaged screens or grates, and can cause plugging of the cyclone and/or damage to rigid, ceramic type apexes and lower cyclone liners.

Typically, the splash skirt portion, when needed, is attached to the lower flange of an apex and wears at a different rate than other parts of the cyclone. Ordinarily then, in order to replace the skirt section, it must be unbolted from the bottom flange of the apex. Furthermore, even though the lower portion of the cone does not wear as fast as the apex and skirt, it still wears considerably more rapidly than the upper portions of the cone. As a result, the lower cone sections also must be periodically replaced. The total amount of work and man-hours that are required for changing the lower cone sections, apex sections and skirt sections of conventional cyclones is high, increasing the cost of cyclone operations. It would be very desirable to allow cyclone apexes to be quickly replaced in certain instances without turning off a particular cyclone. The state of the art is indicated in U.S. Pat. Nos. 3,902,601; 4,233,160; 3,984,308; 3,724,674; 2,897,972; 2,816,658; and 2,665,809. U.S. Pat. No. 3,902,601 discloses an apex insert which is seated in the lower portion of the cone. The cone is composed of urethane. The upper portion of it rests in and is surrounded by a steel upper cone sleeve and a bolted connection. The need for the replaceable cones, and especially for easily replaceable apexes, is recognized in U.S. Pat. No. 3,902,601, but the arrangement shown does not avoid the severe corrosion of bolts that must be loosened, nor does it avoid as much labor and inconvenience as is desirable. Although various ways of attaching apexes and lower cone sections and skirt sections to cyclones have been used in the prior art, the high amount of labor that is required for replacement of these portions of a cyclone has not been solved.

Accordingly, it is the primary objective of the invention to provide an apparatus and method for achieving a quick release connection of an apex to a cone of a cyclone to allow rapid replacement or unplugging of the apex by a single worker.

It is another object of the invention to provide a low cost apex which can be discarded after use.

It is another object of the invention to eliminate metal housings and reduce the total number of components of a cyclone.

It is another object of the invention to provide a means for effectively replacing an apex of a stand by or spare cyclone without stopping the entire cyclone operation and without requiring the efforts of more than a single worker in the replacement operation.

It is another object of the invention to provide means for enabling an operator or worker to quickly and easily recognize when the apex of a cyclone needs to be replaced.

It is another object of the invention to provide an apex having the advantage of long wear associated with ceramic apexes without the high costs thereof.

It is another object of the invention to provide a ceramic apex that continues to be useable even if the ceramic material is impacted and cracked by a large object.

SUMMARY OF THE INVENTION

Briefly described, and in accordance with one embodiment thereof, the invention provides a quick release apparatus for effectuating rapid replacement of the apex of a cyclone. In one described embodiment of the invention, an apex includes a cast urethane, fiberglass or other plastic housing with a ceramic liner or a very thin tungsten carbide liner chemically bonded therein. An integral splash skirt is attached to the lower section. An annular flange is attached to the top of the apex and is integral therewith for attachment in fixed relation to the lower flange of the cone section of the cyclone. The quick release device includes a split ring clamp with a first half ring section having an upper flange or lip, the midportion of which is tightly bolted or otherwise attached to the top surface of the flange at the bottom of the cone. A second half ring section of the clamp ring is pivotally connected to the first section of the clamp ring. Both sections of the quick release ring have corresponding upper and lower lips or flanges that engage the cone flange and the apex flange, respectively. The lower surface of the flange of the apex is sloped to cause tightening of the upper surface of the flange of the apex against the lower surface of the flange of the cone as the quick release split clamp ring is tightened. Even for a large cyclone, a single worker can easily and quickly replace a worn apex in a few minutes, without the need for removing and replacing corroded bolts and simultaneously holding the apex in alignment with the lower flange of the cone. A "blow-through" or "weep" hole extending through the semirigid housing causes a minute amount of leakage that provides an indication to a worker that the liner is worn through.

BRIEF DESCRIPTION OF THE DRAWINGS

FIG. 1 is a partial section view of a cyclone.

FIG. 2 is a partial section view useful in explaining the operation of the cyclone of FIG. 1.

FIG. 3 is a section view useful in illustrating prior art apex and splash skirt configurations with bolt-on attachment flanges.

FIG. 5B is another partial perspective view illustrating the quick release clamp and apex assembly of FIG. 5A in its locked configuration.

FIG. 8 is a perspective view illustrating an apex with a cast urethane, neoprene, or rubber housing and a slip-in, loose ceramic, urethane, rubber, or special cast abrasion/corrosion resistant metal alloy apex liner.

FIG. 9 is a section view taken along section line 9—9 of FIG. 8.

FIG. 10 is a partial exploded perspective view of a plastic apex with a threaded connection to the cone of a cyclone.

FIG. 11 is a section view taken along section line 11—11 of FIG. 10.

FIG. 12A is a section view of another apex of the present invention.

FIG. 12B is a top view of the apex shown in FIG. 12A.

FIG. 13A is a top view illustrating a track in which the apex of FIGS. 12A and 12B laterally slides to a position beneath the cone of a cyclone.

FIG. 13B is a front view of the track shown in FIG. 13A.

FIG. 13C is a side view of the track shown in FIG. 13A.

FIG. 17 is a partial cutaway section view of an alternate embodiment of the invention.

FIG. 17A is a partial section view of another alternate embodiment of the invention.

FIG. 18 is an enlarged view of detail 18 of FIG. 17.

DESCRIPTION OF THE INVENTION

Figure 4:
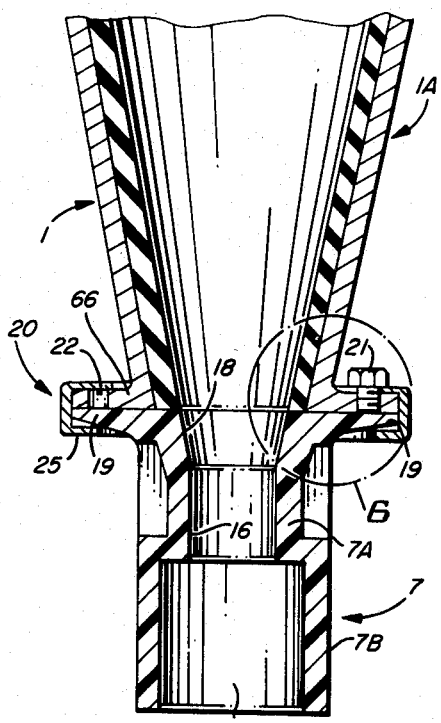
FIG. 4 is a section view illustrating the quick release clamp mechanism of the present invention.

Referring now to FIGS. 1 and 2, the basic features of a cyclone will be described. Reference numeral 1 designates the entire cyclone. Briefly, the input to cyclone 1 is in the form of a slurry containing, for example, a range of different sized ore particles received or pumped from a grinding mill. (Cyclones are also used to separate other kinds of particles of different sizes, for example, in making pulp for paper manufacturing operations.) This slurry of ore particles is fed into inlet 2 of cyclone 1, as indicated in FIG. 2 by arrow 3. The slurry pumped through the inlet passes into the portion of cyclone 1 surrounding a vertical cylindrical vortex finder 5 and circulates around it in the direction indicated by arrow 4. Due to the weight of the incoming slurry, peripheral portions of it, and especially the larger particles therein, tend to fall downward as it circulates (see arrow 4) into the cone section 1A, as indicated by arrow 6. Some larger cyclones have a removable "lower cone" section, which is designated by reference numeral 1B in FIG. 1. An apex 7 is removably attached to the bottom of the lower cone section 1B. Dotted line 8 in FIG. 1 represents a vortex which consists of an upwardly moving quantity of the finer particles contained in the inlet slurry 3 moving in the direction of arrows 10 to the outlet 11 of cyclone 1. The heavier particles and water carrying them are discharged through the orifice of apex 7.

At this point, understanding of the problems of the prior art apexes will be best understood by reference to FIG. 3, wherein reference numeral 7 designates an apex.

Reference numeral 13 in FIG. 3 generally designates an anti-splash skirt. Apex 7 has an outer jacket or "spool" designated by reference numeral 7 having an upper flange 7B and a lower flange 7C. The jacket or spool 7A may be cast iron or other metal. Internally, apex 7A is lined with a suitable abrasion resistant neoprene, urethane, rubber or ceramic liner 14 which is much more resistant than the iron to abrasion of the coarser particles being forced at high density and high velocity through the orifice of apex 7. Especially pertinent to the present invention is the fact that the upper flange 7B of apex 7 is circumferentially bolted by means of bolts 15 to the lower flange 1C of cone section 1A. As previously mentioned, these bolts must be loosened and removed, if possible, by means of a wrench, in order to replace apex 7 in FIG. 3 when it becomes worn. Often, a torch is required to cut the bolts 15 loose because they are so badly corroded, even after only a few months of cyclone operation. Similarly, splash skirt 13 is peripherally bolted by means of bolts 16 which draw the lower flange 7C of apex 7 against the flange 13A of skirt 13. Often, both sets of bolts 15 and 16 must be removed in order to replace a worn out apex 7, if skirt 13 is not also worn out. Note that skirt 13 may be lined with the same abrasion resistant material as apex 7, but has a larger inside diameter.

Referring now to FIG. 4, an important feature of the present invention will be explained. As in FIG. 1, reference numeral 7 designates the apex attached to the bottom flange 66 of cone 1A. Apex 7 in FIG. 4 includes an orifice 16, the correct diameter of which is critical to efficient operation of cyclone 1. An enlarged skirt orifice is designated by reference numeral 17. Both the apex portion 7A and the skirt portion 7B are cast out of neoprene, urethane, or rubber having a durometer number selected to provide optimum resistance to abrasion and/or corrosion by the particular kind of slurry being fed through cyclone 1. The upper portion of orifice 16 is designated by reference numeral 18 and is flared outward to match the inside surface of the lower portion of frusto-conical cone section 1A. An annular circumferential flange 19 is integrally cast with the rest of the apex/skirt unit 7, and has a slightly sloped lower surface, the purpose of which is subsequently explained.

Figure 5A:
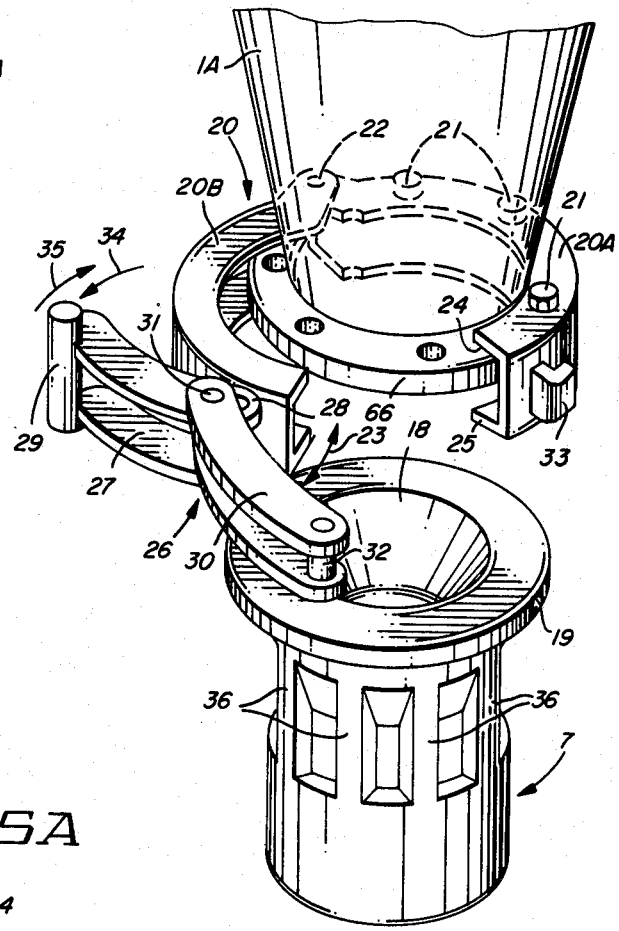
FIG. 5A is a partial perspective view useful in illustrating the quick release apex clamp assembly of the present invention.
Figure 6:
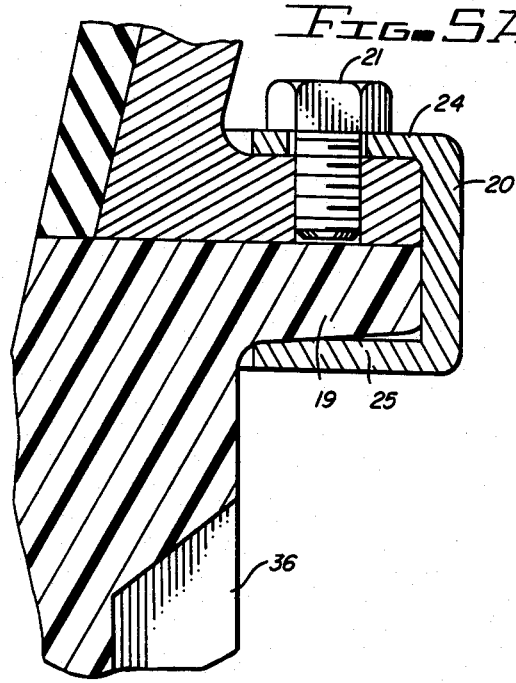
FIG. 6 is a partial section view which is an enlarged view of detail six in FIG. 4.

Referring now to FIG. 5A, as well as to FIG. 4, a quick release split clamp ring 20 is used to securely attach apex/skirt unit 7 to the bottom flange 66 of cone 1A. Clamp 20 is a split ring clamp having a first portion 20A which is peripherally bolted by means of bolts 21 to the upper surface of cone flange 66. The freely swinging section 20B of quick release clamp 20 is pivotally connected by pin 22 to the stationary section 20A and pivoting section 20B of quick release clamp 20 has an upper lip or flange 24 which engages the upper surface of cone flange 66 and a lower lip of flange 25 which engages the lower, sloped face of flange 19 of apex/skirt unit 7, as seen in FIG. 4 and FIG. 6.

A locking and latching mechanism generally designated by reference numeral 26 in FIG. 5A is attached to the free end of clamp ring member 20B. Latch mechanism 26 includes a first lever 27 having an inner end pivotally connected by a pin 28 to the outer surface of the free end of clamp member 20B. A handle 29 which can be easily gripped by one hand of a worker is attached to the outer end of lever 27. Locking assembly 26 includes a latch arm 30, one end of which is connected pivotally by a pin 31 that is spaced from pin 28 on lever 27. At the outer free end of arm 30 is a catch bar 32 that engages a hook 33 which is rigidly connected to the front end of clamp member 20A. Catch bar 32 can engage hook 33 when lever 29 is swung outward from clamp member 20A in the direction of arrow 34. Then, when lever 27 is forced in the direction of arrow 35, arm 30 and bar 32 draw pivotally connected clamp member 20B tightly against the flange 66 of cone 1A and flange 19 of apex 7, so that the upper and lower flanges or lips of each clamp member attach apex 7 tightly to flange 66 of cone 1A. As seen in FIG. 4, the lower face of apex flange 19 is sloped so that as latching mechanism 26 is tightened, an upward force is exerted thereon by lips 24 as clamp 20 is tightened, perfecting the seal between flange 19 and cone flange 66.

The configuration of quick release lock mechanism 26 in its closed position is shown in FIG. 5B.

Figure 7:
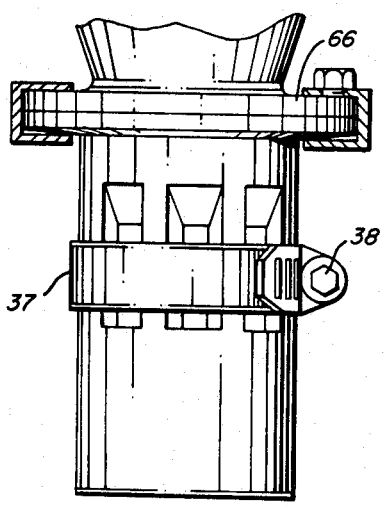
FIG. 7 is a partial elevation view illustrating a clamp band which can be utilized to adjust the inside diameter of the apex of the present invention.

In accordance with another aspect of the present invention, a plurality of spaced ribs 36 are formed about the outer periphery of apex 7. The elimination of the material between ribs 36 reduces the amount of neoprene, urethane or rubber material needed for the smaller diameter apex orifice portion of apex 7, and also reduces the thickness but adds to the rigidity of the structure enough that an adjustable metal band 37 (shown in FIG. 7) can be installed around the ribbed portion of apex 7. Tightening clamp band 37 by rotating the screw gear 38 causes the wall of the ribbed portion of apex 7 to be drawn inwardly. This can be done periodically to reduce the diameter of orifice 16 (FIG. 4) to compensate for wear due to abrasion that occurs during operation of cyclone 1.

In accordance with another aspect of the present invention, the apex 7 shown in FIG. 10 is provided with a threaded upper end portion 39. The threaded portion 39 fits into mating threads 40 in an adapter flange 41. Adapter flange 41 has holes which are aligned with holes in cone flange 66 of cone 1A and is permanently bolted thereto by means of bolts 42. Then apex 7 is installed on and removed from cone 1A by simply threading it into or out of adapter 41. In accordance with another aspect of the present invention, a "weep" hole 43 is provided adjacent to the apex orifice portion of apex 7, and extends part way through the wall thereof, as best seen in the section view of FIG. 11. Then, when abrasion has worn the wall thickness adjacent to apex orifice 16 to the point indicated by dotted lines 44 in FIG. 11, a small amount of the water or other liquid in the slurry will slowly leak out (through) blow hole 43, thereby alerting a roving operator that it is time to discard apex 7 and replace it with a new one.

Referring now to another embodiment of the invention shown in FIGS. 8 and 9, apex "housing" 45 has an upper flange 46 which can be engaged by the lower lips of quick release clamp 20 shown in FIGS. 5A and 5B. Inside apex housing 45 is an integral ledge 47 (FIG. 9). A loose, slide-in apex 48 can be dropped into the opening at the upper end of apex housing 45 in the direction of arrow 49 (FIG. 8) until its lower edge rests on ledge 47, as shown in FIG. 9. Slide-in apex 48 can be made of ceramic or other long life, highly abrasion resistant, corrosion resistant material. When it is time to change the apex of a cyclone having the device shown in FIGS. 8 and 9 therein, the quick release clamp 20 is simply opened to release apex housing 45, which then is removed from the cone. The worn out slide-in apex is removed and discarded, and a new one is inserted in its place. The apex housing 45 with the new ceramic apex insert 48 therein then is quickly attached to the bottom flange such as 66 of a cone such as 1A in the earlier mentioned drawings.

In accordance with another embodiment of the present invention, a laterally slidable apex 50 with an integral skirt is shown in FIGS. 12A and 12B. The particular embodiment of the invention shown in FIGS. 12A and 12B has apex housing 45 and a removable apex insert 48 therein shown in FIGS. 12A and 12B. However, the other apex configurations shown in the drawings could also be utilized. A large "modified trapezoidal" flange 51 is attached to the top edge of apex 50 or, more particularly, to the top edge of apex housing 45. The apex support flange 51 includes a leading edge 52 and two opposed side edges 53 and 54, each of which slope outwardly by approximately three degrees from a line perpendicular to leading edge 52. At the trailing edge of apex support flange 51 there is an elongated opening 55 which serves as a handle for apex support flange 51.

As best seen in FIG. 12A, the lower surface 56 of apex support flange 51 is tapered, so that as apex support flange 51 is inserted into the track 57 shown in FIGS. 13A-13C to a "seated" position, apex support flange 51 is drawn tightly upward against the bottom surface of a flange such as 66 of a cone, such as 1A, as shown, for example, in FIG. 10.

On the top of apex support flange 51, an annular seaing bead 59 having a triangular cross section is shown on the upper surface of apex support flange 51 and around the hole 59 into which removable apex insert 48 is inserted. Sealing bead 58 forms a tight seal with the bottom surface of flange 20 of cone 1A.

Referring now to FIGS. 13A-13C, it is seen that track 57 includes two members 57A and 57B which are bolted onto the top surface of a flange such as 66 of a cone such as 1A by means of bolts 60 and 61, respectively.

As best seen from the front view shown in FIG. 13B, track member 57A has an upper flange 61 which is horizontal and a lower flange 62 which is sloped to accommodate the sloped lower surface 56 of apex support flange 50 shown in FIGS. 12A and 12B to thereby accomplish tightenting of sealing ring 58 against the bottom surface of cone flange 20 as the apex support flange 51 is inserted into track 57. The configuration of track member 57B is the mirror image of that of track member 57A. In order to lock apex support flange 51 into place once it has been inserted, a lock hole 62 is provided therein, and a pin 64 is inserted in lock hole 62 and extends into a corresponding aligned hole 63 in the upper surface of apex support flange 51 (FIG. 12B).

Figure 14:
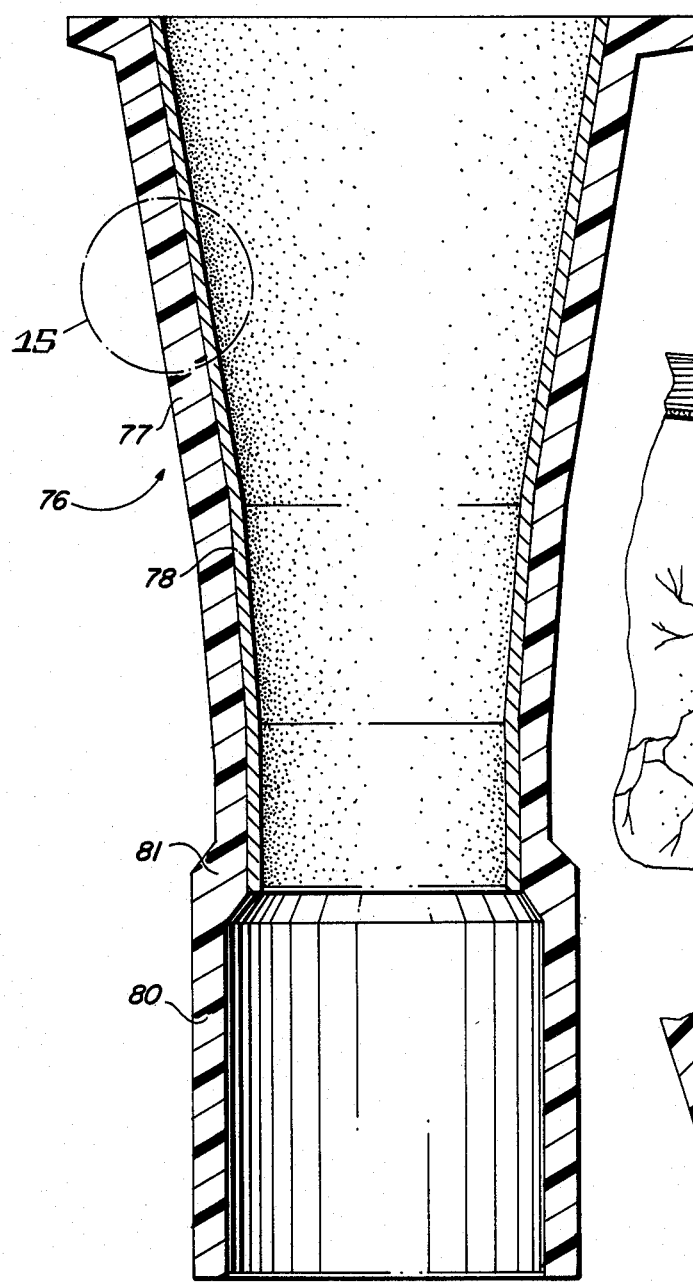
FIG. 14 is a section view of an embodiment of the invention in which an apex includes a ceramic liner chemically bonded to the interior surface of a plastic, semirigid housing.

Referring now to FIG. 14 an alternate embodiment of the invention is shown wherein an expendable apex 76 includes a urethane housing 77 which is entirely similar to urethane apex 7 of FIGS. 4 and 5A, except that a thin ceramic liner 78 is chemically bonded to the inner wall of the housing of the urethane housing 77, so that the inside configuration of the ceramic liner 78 is identical to the inside configuration or shape of urethane apex 7 in FIGS. 4 and 5A. An integral splash skirt 80, also composed of urethane, is attached by means of a transition region 81 to the lower portion of apex 76. An upper flange 79 for engagement by a quick release clamp (such as 26 of FIG. 5A and 5B) is provided on the upper end of urethane housing 77.

Figure 15:
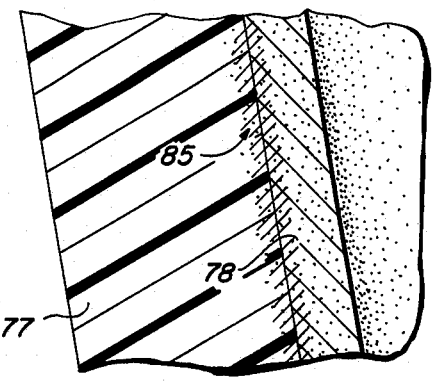
FIG. 15 is an enlargement of detail 15 of FIG. 14.

In FIG. 15, reference numeral 85 designates the chemical bonding between urethane housing 77 and ceramic liner 78.

Ceramic liner 78 can be cast of high purity alumina crystals bonded with crystaline aluminum silicate and manufactured by a firing process. The ceramic liner 78 is cast independently of the urethane housing 77 and is chemically treated for superior adhesion to urethane prior to pouring of the urethane. Of course, other ceramic materials, such as nitrite bonded silicon carbide, could also be used.

Figure 16:
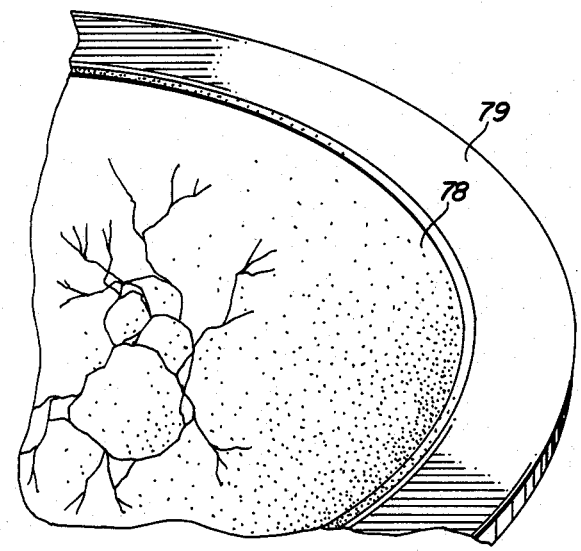
FIG. 16 is a partial top view of the apex of FIG. 14 illustrating the continued usefulness of the apex even after the ceramic liner is shattered by a large object such as a grinding ball.

The thickness of the ceramic liner 78 which is chemically bonded to the urethane housing 77 can be much less than the thickness of the loose ceramic inserts such as 78 in FIG. 9, because the latter ceramic inserts must be cast thick enough to provide the needed structural strength to resist breakage during use and withstand forces caused by various solid media which may occasionally pass into the cyclone with the slurry, whereas the chemically bonded liners such as 78 do not need to have such structural strength because it is provided by the urethane housing 77. If a crack such as 82 of FIG. 16 is produced in the ceramic material, the liner 78 does not shatter, but remains chemically bonded to the urethane housing 77, and the entire apex 75 can continue to be used, the only disadvantage being perhaps slightly faster wear in the vicinity of the crack location 82.

As a practical matter, a typical thickness for the ceramic liner 78 is approximately $\frac{1}{4}$ of an inch, although any thickness in the range from approximately $\frac{3}{8}$ of an inch to approximately $\frac{1}{2}$ of an inch would be practical in various applications.

A very significant advantage of the chemically bonded liner 78 is that much less of the high cost ceramic material is needed, so the cost of the expendable or throw away apex 76 is much less than the cost of a loose fitting non-bonded ceramic liner of the type previously described herein.

Another significant advantage of the chemically bonded ceramic liner 78 is that it provides very long life with very little change in the effective diameter of the interior of the apex, allowing optimum cyclone operation for long periods of time.

The manufacture of the ceramic-lined apex 76 is relatively simple, because the pre-cast ceramic liner 78 serves as the inner part of the mold into which the urethane material is poured, after suitable chemical preparation of the outer surface of the ceramic liner 78. Due to the relatively small amount of ceramic material provided, all of the advantages of prior ceramic liners are achieved with none of the disadvantages, and the entire throw-away apex 76 will provide the same advantages with less cost than the conventional thick ceramic liners alone.

The technology for providing the above mentioned chemical bonding is readily available, and is commonly used for bonding urethane to steel plates.

More specifically, the chemical bonding of the ceramic liner 78 of FIG. 14, or the metal liner 87 in subsequently described FIGS. 17 and 18, can be provided in a process including providing an extremely clean outer surface on the ceramic or metal liner, applying a bonding agent to the ceramic or metal liner, allowing the bonding agent to dry, preheating a mold that defines the outer surface configuration of the urethane portion of the apex to be formed to a temperature in the range of 225° to 250° Fahrenheit, and mixing the prepolymer and curative agent of which the urethane is made and feeding the mixture into the mold between the preheated mold and the heated ceramic or metal liner, and allowing it to harden. The structure results in a good chemical bonding of the urethane to the outer surface of the ceramic or metal liner. Various bonding agents, such as Thixon 406, available from Whittaker Chemical Co. can be used. The basic process is well known and widely practiced by numerous venders in the industry, such as Uniroyal, Upjohn, and many others. Although this is the preferred bonding technique, there are various cold bonding techniques that may also give adequate bonding.

Referring next to FIGS. 17 and 18, a variation on the previously described embodiment of the invention as shown, wherein instead of providing a chemically bonded ceramic liner 78, as in FIGS. 14–16, a thin metal liner is provided instead. In FIGS. 17 and 18, the metal liner is designated by reference numeral 87. Metal liner 87 is chemically bonded to the urethane housing 77 in the same manner described above for providing chemical bonding between ceramic liner 78 and urethane housing 77 in FIG. 14. However, in FIGS. 17 and 18, the urethane "skin" 77 is much thinner (typically ⅜ inch thick) than the urethane housing 77 in FIG. 14. In fact, the urethane skin 77 can be completely eliminated if a metal ring flange 100 is provided around the upper edges of metal liner 87, as shown in FIG. 17A, to support the urethane flange 98 If the metal ring flange 100 is thus provided, urethane flange 98A can be split as shown in FIG. 17A so that it is chemically bonded to both the upper and lower faces of metal ring flange 100, so that the required strength is achieved, and the desirable sealing properties and sloped lower surface of urethane flange 98 are retained. The split urethane flange 98A could even be loosely fit to ring flange 100 and reused when the liner is replaced.

The metal liner 87 can be composed of mild steel and should be at least one-eighth of an inch thick. Before the chemical bonding/urethane molding operation is performed, however, an extremely hard inner surface designated by reference numeral 88 is provided on the inner surface of metal liner 87. This is achieved by any of various techniques, including flame plating of tungsten carbide, to form the thinner inner surface layer 88. Flame plating techniques for blasting particles of tungsten carbide to the surface of the metal liner 87 are well known, and are described in references such as "Technical Metals", by Harold V. Johnson, 1968, Charles A. Bennett Publishing Company.

The thickness and taper of the upper lip of the urethane skin 87 designated by reference numeral 98, can be the same as previously described in order to allow the quick release split ring clamp previously described to quickly and conveniently attach the apex 86 of FIG. 17 to the lower end of a cyclone cone and provide a tight seal therewith.

The tungsten carbide inner surface 88 can be tapered in thickness so as to provide the greatest thickness at the bottom portions where the wear is greatest and is thinnest at the top. For example, the thickness of the tungsten carbide layer 88 at the bottom may be approximately 60 mils thick, whereas at the top it may be only 10 mils thick.

Alternately, metal liner 87 is composed of a suitably hard metal such as chrome white iron. Chrome white iron castings can be obtained from Dyna Cast Corporation, of Portland, Ore. These castings are known to have a hardness of roughly 720 Brinell.

In FIG. 17, an optional detachable skirt 90 is shown, having an outer housing 99 of urethane or other abrasion resistant material with an inner lip 92 that snaps over an outer flange or lip 93 at the bottom of the urethane skin 77 A blow hole or weep hole 91 extends through the urethane skin 77 at the portion of the apex having the smallest diameter to provide a visual indication of leakage when the metal liner 87, including its hardened inner surface, is worn through. This same weep hole may be provided in the light metal shell without urethane or plastic housing to indicate worn out lining.

An advantage of the above-described metal liner is that the tungsten carbide inner surface 88 is so hard that it may wear three to five times slower than typical ceramic material previously described. This has the advantage of allowing provision of a low cost, throw away apex that has nearly constant apex diameter throughout its useful life. For example, the apex diameter may vary by only one-eighth inch during six months of normal wear.

If desired, the skirt 90 in FIG. 17 can be also lined with a metal liner having a tungsten carbide inner surface to increase its life. If desired, the skirt 90 and its liner can be integral with, rather than separable from the apex 86.

Figure 19:
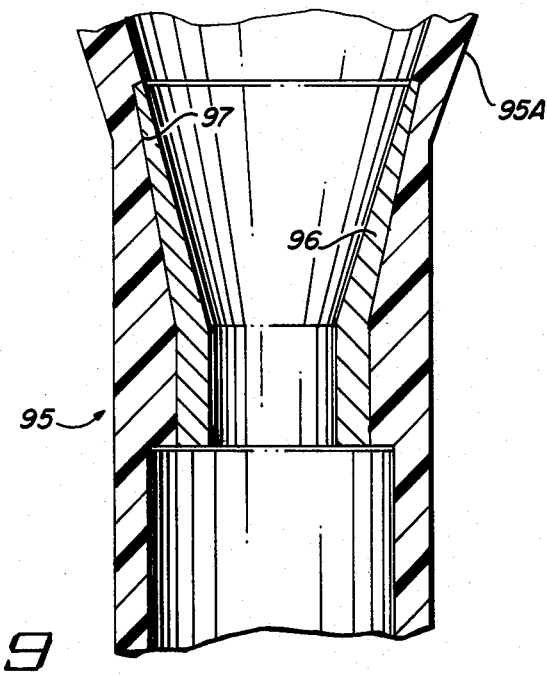
FIG. 19 is a partial section view of another alternate embodiment of the invention.

Referring next to FIG. 19, a variation on the device shown in FIG. 17 is disclosed, wherein an apex 95 has a thick urethane housing 95A. An apex "insert" or liner 96 that is chemically bonded to the urethane in the manner described previously, and is embedded in a recess 97 in the urethane housing 95A. Thus, the metal liner 96 is present only in the smallest diameter portions of the apex 95 where the amount of abrasion is greatest, and where variations in inner diameter of the apex cause the most variations in the efficiency of the cyclone separating process.

It should be appreciated and understood that any of the apexes disclosed herein can be extended upward to include, as integral portions thereof, the lower "cone" section of a cyclone, and that the liners described herein can extend into such integral cone sections, if desired.

While the invention has been described with reference to several particular embodiments thereof, those skilled in the art will be able to iake various minor modifications to the disclosed embodiments without departing from the true spirit and scope of the invention. As an example, other quick release techniques for attachment of the upper flange of the apex section than those described herein could be provided. Various other techniques for providing hard surfaces or the liners can be provided.

I claim:

1. A quick release apex apparatus for a cyclone, said quick release apex apparatus comprising in combination:

(a) a split ring clamp having a first semicircular ring section and also having a second semicircular ring section and means for rigidly connecting said second semicircular ring section in fixed relationship to a flange of a cone of said cyclone, said first and second semicircular ring sections each having a first end and a second end, said first end of said first semicircular ring section being pivotally connected to said first end of said second semicircular ring section;

(b) quick release means having a handle that is easily actuatable by a first hand of an operator for drawing said second end of said second semicircular ring section toward said second end of said first semicircular ring section and locking said second end of said first semicircular ring section tightly to said second end of said second semicircular ring section and for releasing said second end of said first semicircular ring section from said second end of said second semicircular ring section;

(c) a plastic apex housing including an upper integral flange having a sloped lower surface attached to the top of said apex housing, said split ring clamp engaging said sloped lower surface of said flange of said plastic apex housing to draw an upper surface of said flange of said plastic apex housing tightly against a lower surface of said flange of said cone as said quick release means is actuated to its locked position, wherein an operator can use a first hand ot either lock or release said quick release apex to said cone while simulataneously using a second hand to maintain said plastic apex housing in alignment with said cone; and (d) an abrasion resistant apex liner and bonding means for chemically bonding an outer wall surface of said abrasion resistant apex liner to an inner wall surface of said plastic apex housing, said abrasion resistant apex liner having much more resistance to abrasion than said plastic apex housing, whereby the efficiency of said cyclone remains relatively constant due to the low rate of abrasion of said abrasion resistant apex liner.

2. The quick release apex apparatus of claim 1 wherein said abrasion resistant apex liner is composed of ceramic.

3. The quick release apex apparatus of claim 1 wherein said abrasion resistant apex liner is composed of high purity alumina crystals bonded with crystalline aluminum silicate.

4. The quick release apex apparatus of claim 1 wherein said abrasion resistant apex liner is composed of metal.

5. The quick release apex apparatus of claim 4 wherein said abrasion resistant apex liner includes a generally cone-shaped liner of relatively thick, soft steel and a relatively thin, hardened inner surface layer.

6. The quick release apex apparatus of claim 5 wherein said thin, hardened inner surface layer is composed of tungsten carbide.

7. The quick release apex apparatus of claim 2 wherein the thickness of said abrasion resistant apex liner is equal to the amount of wear thereof that can be tolerated in a minimum diameter portion of means defining a hole through said quick release apex before the change in the minimum diameter of the means defining the hole become so great that the efficiency of said cyclone is unacceptably reduced.

8. The quick release apex apparatus of claim 1 including means defining a weep hole extending through the wall of said plastic apex housing to said abrasion resistant apex liner adjacent to a minimum diameter portion of means defining an apex hole through said quick release apex to allow leakage to indicate when said abrasion resistant apex liner is worn through.

9. The quick release apparatus of claim 6 wherein the thickness of said thin, hardened inner surface layer tapers from a maximum value in a lower, minimum diameter portion of said abrasion resistant apex liner to a minimum value in an upper, maximum diameter portion thereof.

10. A quick release apex apparatus for a cyclone, said quick release apex apparatus comprising in combination:

(a) a split ring clamp having a first semicircular ring section and also having a second semicircular ring section and means for rigidly connecting said second semicircular ring section in fixed relation to a flange of a cone of said cylone, said first and second semicircular ring sections each having a first end and a second end, said first end of said first semicircular ring section being pivotally connected to said first end of said second semicircular ring section;

(b) quick release means having a handle that is easily actuatable by a first hand of an operator for drawing said second end of said second semicircular ring section toward said second end of said first semicircular ring section and locking said second end of said first semicircular ring section tightly to said second end of said second semicircular ring section and for releasing said second end of said first semicircular ring section from said second end of said second semicircular ring section;

(c) an abrasion resistant apex body having a generally conical configuration including a minimum diameter low section and a maximum diameter upper section, and an outwardly flared flange circumferentially disposed about the upper edge of said abrasion resistant apex body; and (d) a plastic flange chemically bonded to the maximum diameter upper section of said abrasion resistant apex body and having a sloped lower surface, said split clamp ring engaging said sloped lower surface of said plastic flange to draw an upper surface of said plastic flange tightly against the lower surface of said flange of said cone as said quick release means is actuated to its locked position, whereby an operator can use a first hand to either lock or release said quick release apex to said cone while simultaneously using a second hand to maintain said abrasion resistant apex body section and said plastic flange in alignment with said cone.

* * * * *